(12) United States Patent
Scheibel et al.

(10) Patent No.: US 6,280,162 B1
(45) Date of Patent: Aug. 28, 2001

(54) RADIAL PISTON PUMP

(75) Inventors: Jörg Scheibel, Oakland Township;
Dean Lewis, Goodrich, both of MI (US)

(73) Assignee: Virtual Data Security, LLC, New York, NY (US)

( * ) Notice: Subject to any disclaimer, the term of this patent is extended or adjusted under 35 U.S.C. 154(b) by 0 days.

(21) Appl. No.: 09/323,002

(22) Filed: Jun. 2, 1999

(51) Int. Cl.[7] .................................................. F04B 53/12
(52) U.S. Cl. ............................................ 417/546; 417/415
(58) Field of Search ..................... 417/546, 523, 417/525, 550, 53, 273, 390, 415; 60/556, 549, 537, 558, 413; 303/116.4; 601/162; 92/72

(56) References Cited

U.S. PATENT DOCUMENTS

| | | | |
|---|---|---|---|
| 4,381,179 | * 4/1983 | Pareja | 417/273 |
| 4,776,773 | * 10/1988 | Quartana, III | 417/390 |
| 4,988,147 | * 1/1991 | Zirps | 303/116.4 |
| 5,249,935 | * 10/1993 | Burgdorf | 417/415 |
| 5,291,675 | * 3/1994 | Matsuda et al. | 60/413 |
| 5,468,127 | * 11/1995 | Elliott et al. | 417/53 |
| 5,634,338 | * 6/1997 | Matsuda et al. | 60/556 |
| 5,975,653 | * 11/1999 | Zaviska | 303/116.4 |
| 5,993,402 | * 11/1999 | Sauer et al. | 601/162 |
| 6,116,146 | * 9/2000 | Steffes | 92/72 |

* cited by examiner

Primary Examiner—Teresa Walberg
Assistant Examiner—Quang Van
(74) Attorney, Agent, or Firm—Baker Botts L.L.P.

(57) ABSTRACT

A pump includes a pump housing with a bore, an inlet and an outlet, a piston movable in the bore, and an inlet valve and an outlet valve which are formed by a cup seal. The piston has a portion of a large diameter and a portion of a small diameter, each of the portions extending through one of the cup seals, whereby a pump chamber is provided between the cup seals.

In a first embodiment, the cup seal encompassing the large diameter is the inlet valve and the cup seal encompassing the small diameter is the outlet valve, and the cup seals are arranged in an annular radial groove provided in the bore.

In another embodiment, the cup seal encompassing the large diameter is the outlet valve and the cup seal encompassing the small diameter is the inlet valve. Here the cup seals are arranged in an annular radial groove provided on the piston.

For noise reduction purposes, the piston is tapered from the large diameter toward the small diameter.

14 Claims, 1 Drawing Sheet

RADIAL PISTON PUMP

BACKGROUND OF THE INVENTION

The present invention relates to a radial piston pump as it is commonly used for hydraulic brake systems with an anti-lock function. Such pumps normally include an inlet valve and an outlet valve which are configured as check valves with a spring-biased steel ball forming the closure member. The inlet valve only permits a fluid flow from an inlet to a pump chamber, while the outlet valve only permits a fluid flow from the pump chamber to an outlet. One wall of the pump chamber is formed by the end surface of a movable piston which is driven by an eccentric gear to perform a reciprocating movement. When the piston moves to increase the volume of the pump chamber, fluid will enter the pump chamber through the inlet valve. With the volume of the pump chamber shrinking, the fluid is expelled through the outlet valve. Without any movement of the piston, the two valves are closed. Known pumps of this kind are expensive to manufacture due to the requirement of precision-machined components for each of the valves, such as the steel ball, a steel valve seat, a compression spring and a guide member for the steel ball in order to keep it aligned with the valve seat.

An object of the present invention is to provide a radial piston pump that is cheaper to manufacture by requiring a smaller number of parts and lesser precision in machining.

SUMMARY OF THE INVENTION

This object is achieved by a pump which provides cup seals as the inlet valve and the outlet valve. Such cup seals have a substantially V-shaped profile with one leg of the V forming a sleeve sealing a first cylindrical surface and the other leg forming a lip touching, with its outer edge, a second cylindrical surface opposite of the first one. If pressure is applied from the closed end of the V-profile, the lip is urged away from the second cylindrical surface and gives way for the pressure medium to pass the cup seal. If pressure is applied from the open side of the V-profile, the lip is pressed against the second cylindrical surface, thereby preventing any flow of pressure medium past the cup seal. The lip can form the outer leg of the V as well as the inner leg. If the lip is the outer leg, the sleeve is mounted on the pump piston. If the lip forms the inner leg, the sleeve is mounted in the bore.

Further details of the present invention will be explained by means of the accompanying drawings.

DETAILED DESCRIPTION OF THE DRAWINGS

Figure 1:
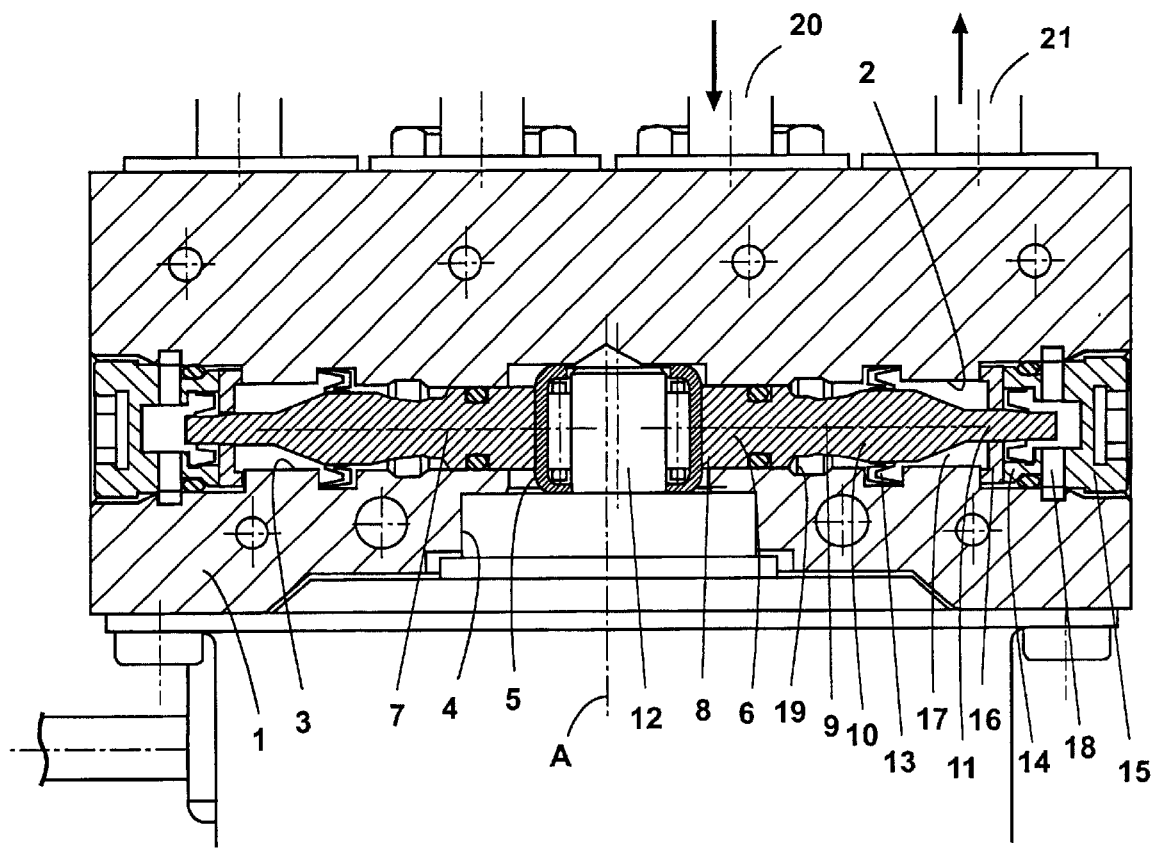
FIG. 1 shows a section through a radial piston pump with cup seals mounted in the pump bore.

In FIG. 1, a pump housing 1 is provides with two pump bores 2 and 3 which are arranged symmetrically with respect to a center plane A and in alignment with each other. From one side, a motor bore 3 is provided in the center plane A to insert roller bearing 5 comprising rollers and a metal cage between the pump bores 2 and 3. In each of the pump bores 2 and 3, there is inserted a pump piston 6 or 7, respectively.

Since this pump is constructed symmetrically with respect to the center plane A, the following description of the right side of the drawing is also applicable to the corresponding parts on the left side. Adjacent to the roller bearing 5, the piston 6 has a first, substantially cylindrical portion 8 which is sealed along its circumference in the pump bore 2. A second portion 9 next to the first portion 8 comprises a smaller diameter and passes over, by means of a conical enlargement of diameter, into a third portion 10 of the pump piston 6 with a diameter, in the embodiment shown, slightly smaller than the diameter of the first portion 8. This portion 10 extends over a length at least equal to the piston stroke defined by the eccentric gear 12 engaging in the roller bearing 5. Finally, the piston diameter is tapered toward a cylindrical fourth portion 11 with a diameter significantly smaller than portion 10 and with an axial length approximately equal to portion 10.

A cup seal 13 is inserted into an annular groove provided in the pump bore in the axial area of portion 10. The cup seal 13 allows a unidirectional flow of fluid past portion 10 from portion 9 to portion 11 by having a substantially cylindrical outer sleeve inserted into the groove and an inner lip touching the piston 6 and forming a v-shaped profile with the cylindrical sleeve. Portion 11 is provided with another annular cup seal 14 which is held by means of a ring-shaped disc 16 in a closure member 15 shutting off the pump bore 2 from the outside. Cup seal 14, due to the smaller diameters involved in this section of the pump, has smaller radial dimensions, but is, in regard of its shape, similar to cup seal 13. Cup seals 13 and 14 form the axial boundaries of a pump chamber 17. Around portion 9, an inlet chamber 19 is provided, while an outlet chamber 18 is accommodated within the closure member 15 opposite of the pump chamber 17. Cup seal 14 permits a unidirectional flow of fluid from pump chamber 17 to the outlet chamber 18. An inlet channel 20 is connected to the inlet chamber 19, and an outlet channel to the outlet chamber 18.

In this arrangement, cup seal 13 forms the inlet valve of the pump, and cup seal 14 forms the outlet valve. The eccentric gear 12 is shown in its extreme position on the right. When it starts rotating and commences a movement to the left, piston 6 will follow either due to a precharging pressure in inlet chamber 19 or outlet chamber 18, or to a coupling device (not shown) between the roller bearing 5 and the piston 6. The volumes of inlet chamber 19 and pump chamber 17 increase, resulting in a difference in pressure between outlet chamber 18 and pump chamber 17 which causes the cup seal 14 to be pressed against closure member 15 and piston 6 by the higher outlet chamber pressure. On the other side of the pump chamber 17 an intake of fluid takes place through inlet 20 into inlet chamber 19 and past cup seal 13 into pump chamber 17. With further rotation of the eccentric gear 12, the piston 6 will finally reach its left stop and return to the right. During this movement, the volume of the pump chamber 17 decreases again urging the pressure fluid to pass cup seal 14 into the outlet chamber 18. Before the fluid can enter the outlet chamber 18, the pressure in the pump chamber 17 has to exceed the pressure in the outlet chamber 18. Due to the increased pressure in the pump chamber 19, the cup seal 13 is pressed tight against the housing 1 and the piston 6, thereby sealing the passage between inlet chamber 19 and pump chamber 17. After reaching its extreme right position, a further movement of the eccentric gear 12 will cause another pump cycle as described.

Figure 2:
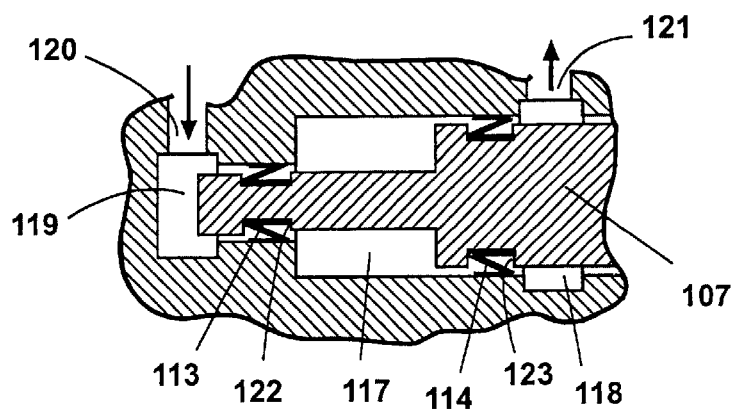
FIG. 2 shows a partial section of a radial piston pump with cup seals mounted on the pump piston.

An alternate embodiment is shown in FIG. 2. Elements with functions corresponding to FIG. 1 carry reference numerals increased by 100 with respect to FIG. 1. Instead of a groove in the housing, this embodiment provides grooves 122 and 123 in the piston 107 for the cup seals 113 and 114. These cup seals 113 and 114, therefore, have their cylindrical sleeves on their inner circumference while a flexible lip is forming a cuff-like outer extension with both, the sleeve and the lip, being arranged in a v-shaped profile. In this embodiment, the inlet chamber 119 is located at the thinner end of the piston 7, and the outlet chamber 118 is located next to the (non-shown) eccentric gear.

The embodiment of FIG. 1, however, has a couple of advantages over the second one: The size of the cup seals 13 and 14 can be larger in diameter than the cup seals 113 and 114. Considering the small measurements of pumps of this kind, it is also advantageous that the piston 6 does not have a weakened cross-section at the location of cup seal 14. The tapered piston of FIG. 1 also provides the benefit of noise reduction by reducing turbulences in the pump chamber and in the inlet chamber. However, a tapered piston can also be used in the embodiment of FIG. 2.

What is claimed is:

1. A radial piston pump comprising:

a pump housing with a bore;

an inlet and an outlet;

an eccentric gear for driving a piston movable in the bore;

a pump chamber having a variable volume depending on a position of the piston within the bore;

an inlet valve connecting the inlet with the pump chamber and permitting a flow of pressure medium from the inlet to the pump chamber; and an outlet valve connecting the pump chamber with the outlet and permitting a flow of pressure medium from the pump chamber to the outlet, wherein the inlet valve and the outlet valve each are formed by a cup seal.

2. A pump according to claim 1, wherein the piston has a portion of a large diameter and a portion of a small diameter, each of the portions extending through one of the cup seals, whereby the pump chamber is provided between the cup seals.

3. A pump according to claim 1, wherein the cup seal encompassing the large diameter is the inlet valve and the cup seal encompassing the small diameter is the outlet valve.

4. A pump according to claim 2, wherein at least one of the cup seals is arranged in an annular radial groove provided in the bore.

5. A pump according to claim 1, wherein the cup seal encompassing the large diameter is the outlet valve and the cup seal encompassing the small diameter is the inlet valve.

6. A pump according to claim 5, wherein at least one of the cup seals is arranged in an annular radial groove provided on the piston.

7. A pump according to claim 1, wherein the piston is tapered from the large diameter toward the small diameter.

8. A radial piston pump comprising:

a pump housing having an inlet and an outlet;

a bore formed in the pump housing;

an eccentric gear for driving a piston movable in the bore; and a first cup seal and a second cup seal forming a pump chamber therebetween, the pump chamber having a variable volume depending on the position of the piston within the bore; and wherein the first cup seal permits a flow of pressure medium from the inlet to the pump chamber and the second cup seal permits a flow of pressure medium from the pump chamber to the outlet.

9. A pump according to claim 8, wherein at least one of the first and second cup seals is arranged in an annular radial groove provided in the bore.

10. A pump according to claim 8, wherein the piston is tapered from the first cup seal to the second cup seal.

11. A pump according to claim 8, wherein the first seal has a larger diameter than the second seal.

12. A radial piston pump comprising:

a pump housing having an inlet and an outlet;

a bore formed in a longitudinal direction within the pump housing;

an eccentric gear for driving a piston in the longitudinal direction within the bore; and a first cup seal and a second cup seal forming a pump chamber therebetween, the piston being tapered from the first cup seal to the second cup seal such that the pump chamber has a variable volume depending on a longitudinal position of the piston within the bore; and wherein the first cup seal forms an inlet valve and permits a flow of pressure medium from the inlet to the pump chamber, and wherein the second cup seal forms an outlet valve and permits a flow of pressure medium from the pump chamber to the outlet.

13. A pump according to claim 8, wherein at least one of the first and second cup seals is arranged in an annular radial groove provided in the bore.

14. A pump according to claim 8, wherein the first seal has a larger diameter than the second seal.

* * * * *

UNITED STATES PATENT AND TRADEMARK OFFICE
CERTIFICATE OF CORRECTION

PATENT NO. : 6,280,162 B1
DATED : August 28, 2001
INVENTOR(S) : J. Scheibel and D. Lewis It is certified that error appears in the above-identified patent and that said Letters Patent is hereby corrected as shown below:

<u>Title page,</u>
Item [73], change the Assignee from "Virtual Data Security, LLC (New York, NY, US)" to -- Continental Teves, Inc. (Auburn Hills, MI, US) --.
Item [74], change the *Attorney, Agent, or Firm* from "Baker Botts L.L.P." to -- Rader, Fishman & Grauer PLLC --.

Signed and Sealed this

Twenty-first Day of January, 2003

JAMES E. ROGAN
*Director of the United States Patent and Trademark Office*